United States Patent
Sekiguchi et al.

(10) Patent No.: US 11,292,916 B2
(45) Date of Patent: Apr. 5, 2022

(54) ALUMINUM PIGMENT, METHOD FOR PRODUCING ALUMINUM PIGMENT, COATING COMPOSITION COMPRISING ALUMINUM PIGMENT, COATING FILM, ARTICLE HAVING THE COATING FILM, INK COMPOSITION, AND PRINTED PRODUCT

(71) Applicant: ASAHI KASEI KABUSHIKI KAISHA, Tokyo (JP)

(72) Inventors: Hiroyuki Sekiguchi, Tokyo (JP); Atsutoshi Sugimoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/751,333

(22) PCT Filed: Aug. 10, 2016

(86) PCT No.: PCT/JP2016/073660
§ 371 (c)(1),
(2) Date: Feb. 8, 2018

(87) PCT Pub. No.: WO2017/030077
PCT Pub. Date: Feb. 23, 2017

(65) Prior Publication Data
US 2018/0230315 A1    Aug. 16, 2018

(30) Foreign Application Priority Data

Aug. 14, 2015    (JP) .............................. JP2015-160205

(51) Int. Cl.
C09C 1/64         (2006.01)
C09D 11/037    (2014.01)
(Continued)

(52) U.S. Cl.
CPC .............. *C09C 1/64* (2013.01); *B22F 1/0011* (2013.01); *B22F 9/04* (2013.01); *C09D 7/61* (2018.01);
(Continued)

(58) Field of Classification Search
CPC .... B22F 1/0011; B22F 9/04; B22F 2009/043; B22F 2301/052; B22F 2302/45;
(Continued)

(56) References Cited

U.S. PATENT DOCUMENTS 4,936,913 A    6/1990 Hieda
5,127,951 A    7/1992 Imasato et al.
(Continued)

FOREIGN PATENT DOCUMENTS

CN    102389977 A    3/2012
DE    69931912 T2    1/2007
(Continued)

OTHER PUBLICATIONS

Machine Translation of JP 2005-240013.*
(Continued)

*Primary Examiner* — Sathavaram I Reddy
(74) *Attorney, Agent, or Firm* — Greenblum & Bernstein, P.L.C.

(57) ABSTRACT

An aluminum pigment including plane particles having a particle planarity (shortest length/particle cross-sectional length) of 0.95 to 1.00 at 60% to 100% by number, wherein the mean particle diameter d50 of the particles is 4 μm to 15 μm. The inventive aluminum pigment is excellent in terms of optical properties, wherein the aluminum pigment can satisfy all of high denseness, high brightness in the regular reflection region, and low generation of scattered light.

11 Claims, 3 Drawing Sheets

(51) Int. Cl.

| | | |
|---|---|---|
| *C09D 201/00* | (2006.01) | |
| *C09D 7/61* | (2018.01) | |
| *C09D 7/40* | (2018.01) | |
| *B22F 1/00* | (2006.01) | |
| *B22F 9/04* | (2006.01) | |
| *C09C 3/04* | (2006.01) | |
| *C08K 3/08* | (2006.01) | |

(52) U.S. Cl.
CPC .............. *C09D 7/70* (2018.01); *C09D 11/037* (2013.01); *C09D 201/00* (2013.01); *B22F 2009/043* (2013.01); *B22F 2301/052* (2013.01); *B22F 2302/45* (2013.01); *C01P 2004/03* (2013.01); *C01P 2004/04* (2013.01); *C01P 2004/20* (2013.01); *C01P 2004/51* (2013.01); *C01P 2004/54* (2013.01); *C01P 2004/61* (2013.01); *C01P 2006/10* (2013.01); *C08K 2003/0812* (2013.01); *C09C 3/041* (2013.01)

(58) Field of Classification Search
CPC .............. C01P 2004/03; C01P 2004/04; C01P 2004/20; C01P 2004/51; C01P 2004/54; C01P 2004/61; C01P 2006/10; C08K 2003/0812; C09C 1/64; C09C 3/041; C09D 7/61; C09D 7/70; C09D 11/037; C09D 11/322; C09D 201/00
See application file for complete search history.

(56) References Cited

U.S. PATENT DOCUMENTS

| | | | |
|---|---|---|---|
| 6,454,847 B1* | 9/2002 | Iri ........................ | B22F 1/0007 106/403 |
| 2003/0008068 A1 | 1/2003 | Josephy et al. | |
| 2003/0008963 A1* | 1/2003 | Hashizume ........... | C09C 1/0078 524/439 |
| 2004/0250731 A1 | 12/2004 | Nagano et al. | |
| 2006/0014854 A1 | 1/2006 | Minami | |
| 2006/0058419 A1 | 3/2006 | Nagano | |
| 2007/0199478 A1 | 8/2007 | Schlegl et al. | |
| 2010/0047199 A1 | 2/2010 | Trummer et al. | |
| 2015/0033987 A1 | 2/2015 | Schmid et al. | |

FOREIGN PATENT DOCUMENTS

| | | |
|---|---|---|
| DE | 102007062942 A1 | 6/2008 |
| EP | 1080810 B1 | 6/2006 |
| JP | S64-054070 A | 3/1989 |
| JP | H03-294360 A | 12/1991 |
| JP | H11-152423 A | 6/1999 |
| JP | 2002-528639 A | 9/2002 |
| JP | 2003-82258 A | 3/2003 |
| JP | 2004-269559 A | 9/2004 |
| JP | 2004-315674 A | 11/2004 |
| JP | 2005-240013 A | 9/2005 |
| JP | 2007-204852 A | 8/2007 |
| JP | 2010-513619 A | 4/2010 |
| JP | 2014-159583 A | 9/2014 |
| JP | 2015-007159 A | 1/2015 |
| JP | 2015-516502 A | 6/2015 |
| WO | 2003/022934 A1 | 3/2003 |
| WO | 2004/087816 A1 | 10/2004 |

OTHER PUBLICATIONS

International Search report from Patent Application No. PCT/JP2016/073660, dated Nov. 1, 2016.
International Preliminary Report on Patentability from Patent Application No. PCT/JP2016/073660, dated Feb. 20, 2018.

* cited by examiner

[Figure 1]
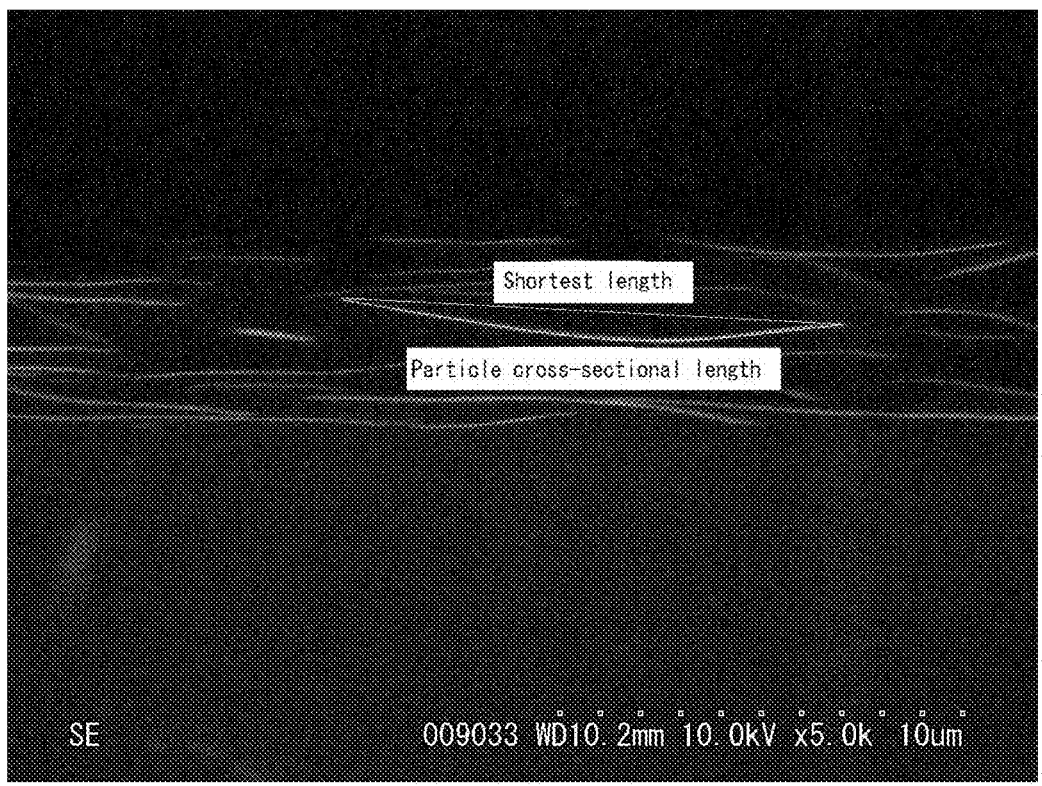

[Figure 2]
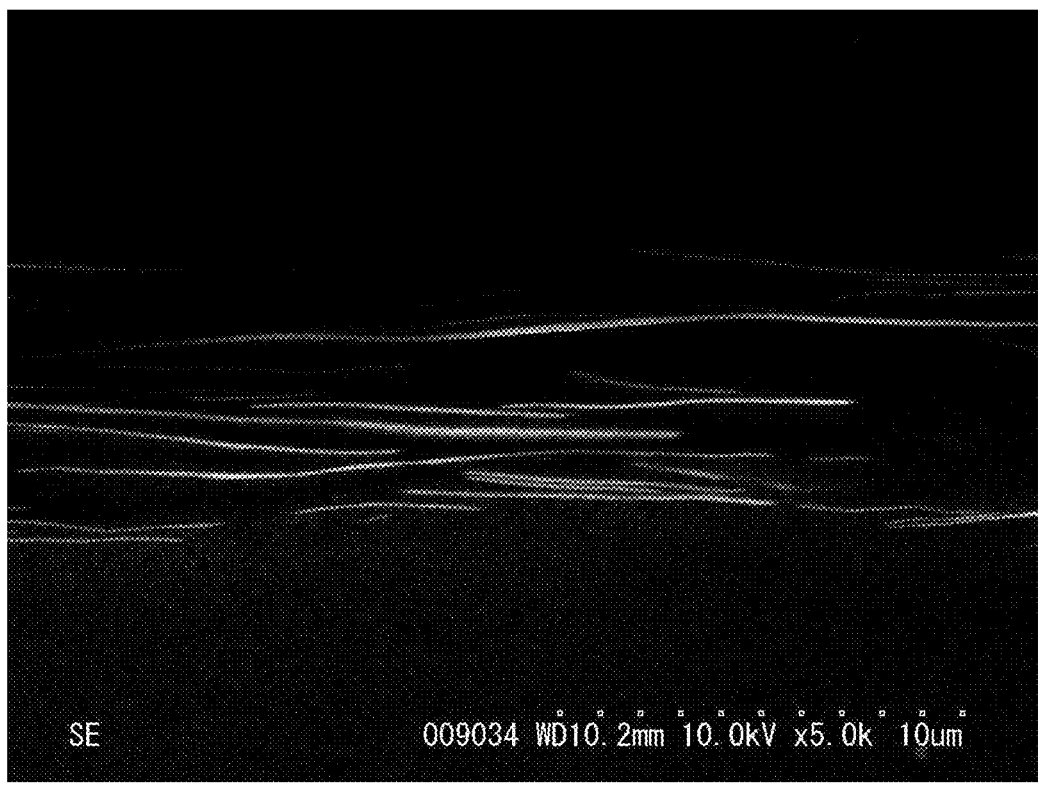

[Figure 3]
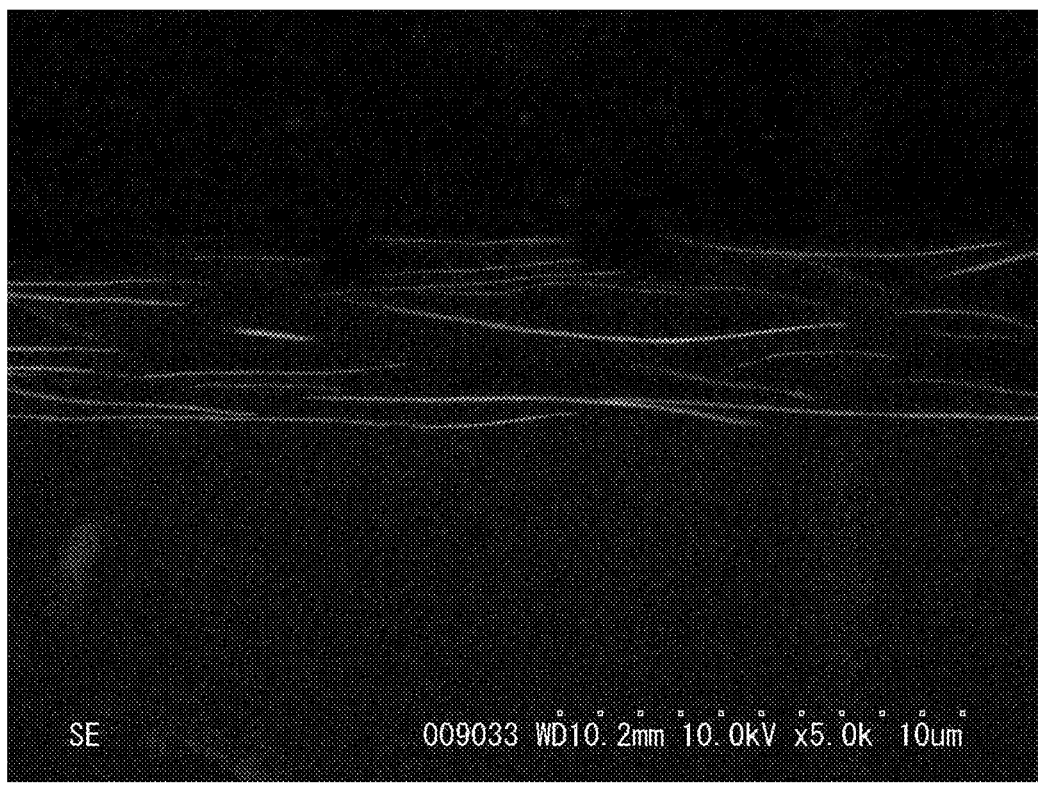

ALUMINUM PIGMENT, METHOD FOR PRODUCING ALUMINUM PIGMENT, COATING COMPOSITION COMPRISING ALUMINUM PIGMENT, COATING FILM, ARTICLE HAVING THE COATING FILM, INK COMPOSITION, AND PRINTED PRODUCT

TECHNICAL FIELD

The present invention relates to an aluminum pigment and a method for producing the same, a coating composition comprising aluminum pigment, a coating film, an article having the coating film, an ink composition, and a printed product.

BACKGROUND ART

Conventionally, an aluminum pigment has been widely used in various fields as a pigment having both a unique metallic feeling which is not found in other pigments and an excellent hiding power for the base.

In recent years, a mirror-like appearance having high-grade sense has been regarded as important in automobile body painting, automobile interior part painting, optical instrument metallic painting, etc. From the viewpoint of exhibiting values equivalent to or greater than the original functions of the concerned product, it is anticipated that such a mirror-like appearance having high-grade sense will be further regarded as important in the future.

Examples of a method of realizing the aforementioned excellent appearance characteristics include atomization of aluminum pigment particles. It has been known that atomization of aluminum pigment particles has effects on the improvement of denseness.

However, such atomization of aluminum pigment particles has been problematic in that the orientation of aluminum pigment particles in a coating film is decreased by atomization of the particles, and thus, a reduction in brightness or generation of scattered light increasingly occurs.

Examples of a method of solving such a problem include a method of thinning aluminum particles.

For example, Patent Literature 1 discloses that the time required to grind a raw material aluminum powder is prolonged to thin aluminum particles, so as to obtain an aluminum pigment, which is excellent in terms of metallic luster and can realize a plating-like appearance.

In addition, Patent Literature 2 and Patent Literature 3 each disclose a certain thin-film aluminum pigment, wherein workability such as dispersibility is improved by specifying the thickness distribution of aluminum particles (the range of relative width Δh) or the aspect ratio.

Moreover, Patent Literature 4 discloses a method of producing an aluminum pigment according to a metal deposition method. In this production method, a method completely different from a method for producing an aluminum pigment according to a mechanical processing using a grinder is adopted, and in this method, the film thickness of aluminum particles is set to be thin and single thickness, so that an aluminum pigment having extremely good smoothness can be produced, and denseness, high brightness and high luster can be achieved.

PRIOR ART LITERATURES

Patent Literature

Patent Literature 1: Japanese Patent Laid-Open No. 2003-82258
Patent Literature 2: Japanese Patent Laid-Open No. 2014-159583
Patent Literature 3: International Publication No. WO 2004/087816
Patent Literature 4: National Publication of International Patent Application No. 2002-528639

SUMMARY OF INVENTION

Technical Problem

On the other hand, taking into consideration the tendency of design in automobile body painting, automobile interior part painting, and optical instrument metallic painting, there is an increasing demand for a mirror-like metallic design having denseness, extremely high brightness in the regular reflection region, and extremely low generation of scattered light, as well as conventionally highly demanded metallic design having high luster and high brightness.

Moreover, such a mirror-like metallic design has been increasingly demanded also in the field of ink for high-grade printing such as gravure printing, offset printing and screen printing.

The aforementioned aluminum pigment described in each of Patent Literatures 1 to 3 provides excellent metallic luster by thinly extending aluminum particles. However, this aluminum pigment is problematic in that it has not yet achieved sufficient properties, from the viewpoint of realization of all of high denseness, high brightness in the regular reflection region, and low generation of scattered light.

Furthermore, the aluminum pigment described in Patent Literature 4 achieves high denseness and high brightness because it has been produced by a deposition method. However, as described above this aluminum pigment is also problematic in that it has not yet achieved sufficient properties, from the viewpoint of realization of all of high denseness, high brightness in the regular reflection region, and low generation of scattered light.

As mentioned above, all of the conventionally proposed techniques have been problematic in that an aluminum pigment capable of realizing all of high denseness, high brightness in the regular reflection region, and low generation of scattered light has not been obtained.

Hence, in consideration of the aforementioned problems of the prior art techniques, it is an object of the present invention to provide an aluminum pigment being excellent in terms of optical properties and being capable of realizing a mirror-like metallic design, wherein the aluminum pigment can satisfy all of high denseness, high brightness in the regular reflection region, and low generation of scattered light.

Solution to Problem

As a result of intensive studies conducted with regard to the problems of the above-described prior art techniques, the present inventors have focused on the cross-sectional shape of an aluminum pigment particle, and have found that, with regard to the cross-sectional shape of particles in the cross section of a coating film, the ratio of particles having a particle planarity (shortest length/particle cross-sectional length) that is in the range of 0.95 to 1.00 is set to be a specific range, and further, the mean particle diameter (d50) of the particles is also set to be a specific range, so that an aluminum pigment, which has high denseness, extremely high brightness in the regular reflection region and low generation of scattered light, and which is capable of providing a mirror-like metallic design, can be obtained, thereby completing the present invention.

Specifically, the present invention is as follows.

[1]
An aluminum pigment comprising plane particles having a particle planarity (shortest length/particle cross-sectional length) of 0.95 to 1.00 at 60% to 100% by number, wherein
a mean particle diameter d50 of the particles is 4 μm to 15 μm.

[2]
The aluminum pigment according to the above [1], wherein the aluminum pigment comprises the plane particles at 60% to 98% by number.

[3]
The aluminum pigment according to the above [1] or [2], wherein an average thickness t of the particles is 0.03 μm to 0.12 μm.

[4]
The aluminum pigment according to any one of the above [1] to [3], wherein a ratio (d50/t) of the mean particle diameter d50 (μm) of the particles to the average thickness t (μm) thereof is 90 to 250.

[5]
The aluminum pigment according to any one of the above [1] to [4], wherein a surface roughness average Ra of the particles is 2 to 12 nm.

[6]
A method for producing the aluminum pigment according to any one of the above [1] to [5], comprising a step of grinding an atomized aluminum powder using a grinding apparatus comprising a ball mill.

[7]
A coating composition comprising the aluminum pigment according to any one of the above [1] to [5].

[8]
A coating film comprising the coating composition according to the above [1].

[9]
An article having the coating film according to the above [8].

[10]
An ink composition comprising the aluminum pigment according to any one of the above [1] to [5].

[11]
A printed product comprising the ink composition according to the above [10].

Advantageous Effects of Invention

According to the present invention, there can be provided an aluminum pigment, which has high denseness, extremely high brightness in the regular reflection region and low generation of scattered light, and which can realize a mirror-like metallic design.

BRIEF DESCRIPTION OF DRAWINGS

FIG. 1 shows an example of the photograph of the FE-SEM image of the cross-section of an aluminum pigment particle obtained using field emission-type FM-SEM (manufactured by HITACHI/S-4700), which is for use in explaining a method of evaluating the planarity of the aluminum pigment particles.

FIG. 2 shows a photograph of the FE-SEM image of the cross-section of the aluminum pigment particle of [Example 2], which has been obtained using field emission-type FM-SEM (manufactured by HITACHI/S-4700).

FIG. 3 shows a photograph of the FE-SEM image of the cross-section of the aluminum pigment particle of [Comparative Example 1], which has been obtained using field emission-type FM-SEM (manufactured by HITACHI/S-4700).

DESCRIPTION OF EMBODIMENTS

Hereinafter, the mode for carrying out the present invention (hereinafter referred to as "the present embodiment") will be described in detail.

The present embodiment, as described below, is an example for describing the present invention, and is not intended to limit the present invention to the following content. The present invention can be carried out by being appropriately modified within the scope of the gist thereof.

[Aluminum Pigment]

The aluminum pigment of the present embodiment comprises plane particles having a particle planarity (shortest length/particle cross-sectional length) of 0.95 to 1.00 at 60% to 100% by number, wherein the mean particle diameter d50 of the particles is 4 μm to 15 μm.

In the aluminum pigment of the present embodiment, the mean particle diameter d50, particle planarity (shortest length/particle cross-sectional length), and average thickness t (μm) of particles are defined as follows.

The mean particle diameter d50 (μm) is a median diameter, and the mean particle diameter d50 can be measured using a laser diffraction/scattering-type particle size distribution measuring apparatus.

The mean particle diameter d50 of the aluminum pigment of the present embodiment is 4 μm to 15 μm.

The mean particle diameter d50 of the particles of the aluminum pigment of the present embodiment may be within the above described numerical value range, and fine particles or small particles may be selected depending on the finally desired design.

By setting the mean particle diameter d50 of the particles at 4 μm or more, particles can be oriented in a certain direction in a coating film, in which the aluminum pigment of the present embodiment is used, the scattering of light can be reduced, and further, brightness can be increased, and thus, it is preferable.

On the other hand, by setting the mean particle diameter d50 of the particles at 15 μm or less, the after-mentioned particle planarity (shortest length/particle cross-sectional length) is easily adjusted in a preferred range, and a metallic coating film having denseness can be obtained, and thus, it is preferable.

The mean particle diameter of the particles of the aluminum pigment of the present embodiment is preferably 5 μm or more and 13 μm or less, and more preferably 6 μm or more and 12 μm or less.

The mean particle diameter d50 of the aluminum pigment can be controlled by appropriately adjusting the particle diameter of a raw material atomized aluminum powder, the mass of a single grinding ball, and the rotation speed of a grinding apparatus in a step of grinding the raw material atomized aluminum powder using a ball mill in the after-mentioned method for producing the aluminum pigment.

Particle planarity (shortest length/particle cross-sectional length) can be obtained by obtaining the FE-SEM image of the cross section of a coating film formed from a coating composition comprising the aluminum pigment of the present embodiment, and then measuring the planarity using image analysis software.

The measurement method will be described below.

The measurement value obtained by connecting with a straight line, both ends of a particle cross section in the FE-SEM image of the cross section of the above described coating film is defined as a "shortest length". In addition, the measurement value obtained by connecting with a line, both ends of the particle cross section along the shape of the particle cross section is defined as a "particle cross-sectional length".

The value of the ratio of the shortest length to the particle cross-sectional length (shortest length/particle cross-sectional length) is defined as particle planarity.

As the particle planarity approaches to 1.00, it means that the warpage and distortion of the particle are small.

According to the above described definition, the planarity of 100 particles is obtained.

With regard to the degree of the particle planarity, a threshold value for distinguishing is set at 0.95, and particles having a planarity that is in the range of 0.95 to 1.00 are defined as plane particles. The ratio of the plane particles to all particles is determined in percentage (%) by number.

Production of the cross section of a coating film, obtaining of an EF-SEM image, and image analysis can be carried out according to the methods described in the after-mentioned Examples.

The aluminum pigment of the present embodiment comprises the aforementioned plane particles having a particle planarity that is in the range of 0.95 to 1.00 at 60% to 100% by number.

By setting the percentage of the plane particles at 60% or more, the brightness in regular reflection region can be increased, and scattered light can be decreased, so that a preferred design can be obtained.

Specifically, by allowing the aluminum pigment of the present embodiment to comprise particles having a particle planarity that is in the range of 0.95 to 1.00 at 60% to 100% by number, a mirror-like metallic design having extremely high brightness in the regular reflection region, and further, extremely low scattered light, can be obtained.

The content percentage of particles having a particle planarity that is in the range of 0.95 to 1.00 is preferably 60% or more and 98% or less, more preferably 65% or more and 98% or less, and further preferably 70% or more and 98% or less.

By setting the percentage of the plane particles at 98% or less, the grinding time necessary for production of the aluminum pigment of the present embodiment does not become extremely long, and thus, it is excellent in productivity.

The average thickness t (μm) of the particles of the aluminum pigment of the present embodiment can be obtained by performing a measurement using the FE-SEM image of the coating film cross section that has been applied to the aforementioned measurement of the particle planarity, and also using image analysis software.

Specifically, 100 particles are randomly selected from the FE-SEM image of the coating film cross section, the cross-sectional thickness of each particle is then automatically measured, and the arithmetic mean value of the 100 particles is calculated to obtain the average thickness t (μm).

The average thickness t (μm) of the particles of the aluminum pigment of the present embodiment is preferably 0.03 μm to 0.12 μm.

By setting the average thickness t of the particles at 0.03 μm or more, the aforementioned particle planarity (shortest length/particle cross-sectional length) can be easily controlled in the range of 0.95 to 1.00, and the brightness in the regular reflection region can be increased and scattered light can be decreased, and thus, it is preferable.

By setting the average thickness t of the particles at 0.12 μm or less, the shadow area of the end of the particle can be preferably controlled, denseness can be obtained, and scattered light can be decreased, and thus, it is preferable.

The average thickness t (μm) of the particles of the aluminum pigment of the present embodiment is more preferably 0.03 μm or more and 0.10 μm or less, and further preferably 0.04 μm or more and 0.09 μm or less.

The ratio (d50/t) of the mean particle diameter d50 of the particles of the aluminum pigment of the present embodiment to the average thickness t thereof is the aspect ratio of the aluminum particles. In the present embodiment, the aspect ratio is preferably 90 to 250.

By setting the aspect ratio at 90 or more, higher brightness in the regular reflection region and higher hiding power can be obtained. Thus, when the present aluminum pigment is used in thin film coating, a mirror-like, high-grade coating film can be obtained.

Also, by setting the aspect ratio at 250 or less, the warpage, distortion, and cracking of the particles can be prevented, and thus, the rupture of the particles is not generated, and generation of scattered light can be significantly reduced.

The aspect ratio (d50/t) of the particles of the aluminum pigment of the present embodiment is more preferably 100 or more and 250 or less, and further preferably 130 or more and 250 or less.

The surface roughness average Ra of the particles of the aluminum pigment of the present embodiment is an indicator for the smoothness of the surface of an aluminum pigment particle, and the roughness average Ra can be measured using SPM (Scanning Probe Microscope) including an atomic force microscope and the like.

This roughness average Ra is preferably 2 to 12 nm.

By setting the roughness average Ra at 12 nm or less, the smoothness of the particle surface becomes high, and the quantity of regularly reflected light is thereby increased, so that higher brightness feeling can be obtained. By setting the roughness average Ra at 2 nm or more, the grinding time necessary for production of the aluminum pigment of the present embodiment does not become extremely long, and thus, it is excellent in productivity.

The Ra is more preferably 2 to 10 nm, and further preferably 2 to 8 nm.

[Method for Producing Aluminum Pigment]

A method for producing the aforementioned aluminum pigment of the present embodiment will be described below.

The method for producing aluminum pigment of the present embodiment comprises a step of grinding an atomized aluminum powder using a grinding apparatus comprising a ball mill.

Conditions, such as increasing the particle diameter of an atomized aluminum powder used as a raw material, decreasing the mass of a single grinding ball, and reducing the rotation speed of a grinding apparatus, are adjusted, as appropriate, and are combined with one another, so that the percentage of the aforementioned plane particles having a particle planarity (shortest length/particle cross-sectional length) of 0.95 to 1.00 can be increased.

On the other hand, conditions, such as increasing the mass of a single grinding ball, increasing the rotation speed of a grinding apparatus, and decreasing the average thickness t of aluminum pigment particles, are adjusted, as appropriate, and are combined with one another, so that the percentage of the aforementioned plane particles can be decreased.

Taking into consideration the adjustment of the mean particle diameter (d50) to the range of the present embodiment and an increase in productivity, in addition to carrying out the above-described operations, grinding conditions are determined.

When it is considered that the mean particle diameter d50 is set in the range of 4 μm to 15 μm, particularly preferred grinding conditions can be a combination of the following conditions: an atomized aluminum powder having a particle diameter of preferably 1.5 to 5.0 μm, and more preferably 1.5 to 4.0 μm are used as a raw material; the mass of a single grinding ball used in a grinding apparatus is set at preferably 0.08 to 11.00 mg, and more preferably 0.08 to 9.00 mg; the rotation speed of the grinding apparatus is set at 33% to 78%, and more preferably at 36% to 57%, with respect to the critical rotation speed (Nc).

According to the aforementioned method, the impact force given from the grinding balls to the aluminum particles is adjusted, and the ratio of the mean particle diameter d50 (μm) of the aluminum particles to the average thickness t (μm) thereof is set in the range of 90 to 250, so as to obtain the aluminum pigment of the present embodiment comprising plane particles having a particle planarity (shortest length/particle cross-sectional length) that is in the range of 0.95 to 1.00 at 60% to 100% by number.

The specific gravity of grinding balls used in a ball mill or the like is preferably 8 or less, more preferably 7.5 or less, and further preferably 7 or less, from the viewpoint of easily increasing the ratio of the above described plane particles, and increasing the surface smoothness of the aluminum particles.

It is to be noted that the specific gravity of grinding balls is preferably greater than the specific gravity of a grinding solvent. By setting the specific gravity of the grinding balls to be greater than the specific gravity of the grinding solvent, the grinding balls can be prevented from floating on the solvent, sufficient shearing stress can be obtained between the grinding balls, and grinding tends to sufficiently progress.

From the viewpoint of the adjustment of the surface smoothness of the aluminum particles and the durability of the grinding balls, the grinding balls used in the method for producing the aluminum pigment of the present embodiment are preferably balls having high surface smoothness, such as stainless steel balls, zirconia balls, or glass balls.

In contrast, balls having low surface smoothness, such as steel balls or alumina balls, are not preferable from the viewpoint of the adjustment of the surface smoothness of the aluminum particles and the durability of the grinding balls.

As such, for example, in the case of stainless steel balls, it is preferable to use balls, the surface smoothness of which has been increased by mechanical polishing and chemical polishing.

The mass of a single grinding ball is preferably 0.08 to 11.00 mg, as mentioned above.

By using grinding balls having a mass of 0.08 mg/ball or more, the grinding balls do not move individually, but move as a group or a mass, and thereby, generation of the phenomenon in which the shearing stress between grinding balls is reduced and grinding does not progress, the so-called group motion, can be prevented.

On the other hand, by using grinding balls having a mass of 11.00 mg/ball or less, addition of excessive impact force to the aluminum powders is prevented, and thus, generation of warpage, distortion, cracking, etc. can be prevented.

The atomized aluminum powder used as a raw material preferably comprises only small amounts of impurities other than aluminum.

The purity of the atomized aluminum powder is preferably 99.5% or more, more preferably 99.7% or more, and further preferably 99.8% or more.

The mean particle diameter of the atomized aluminum powder used as a raw material is preferably 1.5 to 5.0 μm, and more preferably 1.5 to 4.0 μm.

By setting the mean particle diameter of the atomized aluminum powder at 1.5 μm or more, excessive energy is not added to the particles during the grinding processing, the warpage and distortion of the particles can be prevented, and thereby, the good shape of the particle can be maintained, and thus, it is preferable.

On the other hand, by setting the mean particle diameter of the atomized aluminum powder at 5.0 μm or less, the mean particle diameter of the particles in the grinding processed product can be adjusted to 15 μm or less, and the aluminum pigment of the present embodiment tends to be preferably obtained.

The shape of the atomized aluminum powder used as a raw material is preferably for example, a spherical powder or a teardrop-shaped powder. Using such powders, it is likely that the shape of the aluminum pigment is hardly distorted during the grinding operation. In contrast, a needle-shaped powder or an amorphous powder is not preferable because the shape of the aluminum pigment is easily distorted during the grinding operation.

When the aluminum pigment of the present embodiment is produced using a grinding apparatus comprising a ball mill, a grinding solvent is preferably used.

Examples of the type of such a grinding solvent include, but are not limited to, conventionally used hydrocarbon solvents such as mineral spirits and solvent naphtha, and low viscosity solvents such as alcohol-based, ether-based, ketone-based, and ester-based solvents.

As conditions for grinding an atomized aluminum powder, the volume of the grinding solvent to the mass of aluminum contained in the atomized aluminum powder is preferably 1.5 to 16.0 times, and more preferably 2.0 to 12.0 times. By setting the volume of the grinding solvent to the mass of aluminum contained in the atomized aluminum powder at 1.5 times or more, generation of warpage, distortion, cracking and the like, which is caused by the long-term grinding of the atomized aluminum powder, can be prevented, and thus, it is preferable.

On the other hand, by setting the volume of the grinding solvent to the mass of aluminum contained in the atomized aluminum powder at 16.0 times or less, uniformity in the mill during the grinding operation is improved, the atomized aluminum powder is allowed to efficiently come into contact with a grinding medium, and thus, grinding tends to preferably progress.

The volume of the grinding balls to the volume of the grinding solvent (the volume of the grinding balls/the volume of the grinding solvent) is preferably 0.5 to 3.5 times, and more preferably 0.8 to 2.5 times.

By setting the volume of the grinding balls to the volume of the grinding solvent at 0.5 times or more, the uniformity of the grinding balls in the mill during the grinding operation is improved, and thus, grinding tends to preferably progress.

On the other hand, by setting the volume of the grinding balls to the volume of the grinding solvent at 3.5 times or less, the ratio of the grinding balls in the mill can be adjusted in a preferred range, and lamination of the balls does not become too high. As a result, problems regarding shape deterioration of the particles due to grinding stress, such as warpage, distortion and cracking, can be prevented, and a decrease in the brightness or an increase in the scattered light can be prevented, and thus, it is preferable.

When the aluminum pigment of the present embodiment is produced using a grinding apparatus comprising a ball mill, a grinding aid, as well as the aforementioned grinding solvent, is preferably used.

The grinding aid is not particularly limited, as long as it exhibits characteristics as a non-leafing pigment. Examples of the grinding aid include, but are not limited to, higher unsaturated fatty acids such as oleic acid; higher aliphatic amines such as stearylamine; higher aliphatic alcohols such as stearyl alcohol or oleyl alcohol; higher fatty acid amides such as stearic acid amide or oleic acid amide; and higher fatty acid metal salts such as aluminum stearate or aluminum oleate.

The grinding aid is preferably used in an amount of 0.2% to 30% by mass based on the mass of the atomized aluminum powder.

The ball mill used to grind the atomized aluminum powder has a diameter of preferably 0.6 m$\varphi$ to 2.4 m$\varphi$, and more preferably 0.8 m$\varphi$ to 2.0 m$\varphi$.

By using a ball mill having a diameter of 0.6 m$\varphi$ or more, lamination of the grinding balls does not become too low, the pressure applied to the aluminum particles during the grinding processing can be in a preferred range, and thus, grinding tends to preferably progress.

On the other hand, by using a ball mill having a diameter of 2.4 m$\varphi$ or less, lamination of the grinding balls does not become too high, problems regarding shape deterioration of the particles due to the weight of balls, such as warpage, distortion and cracking, can be prevented, and also, a decrease in the brightness or an increase in the scattered light can be prevented, and thus, it is preferable.

As mentioned above, the rotation speed of the ball mill during the grinding of the atomized aluminum powder is set at preferably 33% to 78%, and more preferably 36% to 57%, based on the critical rotation speed (Nc).

By setting the ratio of the rotation speed/the critical rotation speed at 33% or more, the uniformity of aluminum slurry or ball movement in the ball mill is maintained, and thus, it is preferable.

On the other hand, by setting the ratio of the rotation speed/the critical rotation speed at 78% or less, movements such as the lifting of grinding balls or dropping thereof due to their own weight can be prevented, and the impact force given from the grinding balls to the aluminum particles does not become too high. As a result, problems regarding shape deterioration of the particles, such as warpage, distortion and cracking, can be prevented, and thus, it is preferable.

It is to be noted that the aluminum pigment of the present embodiment can be produced, not only by the aforementioned production method comprising a step of grinding the atomized aluminum powder, but also by a vacuum deposition method.

[Coating Composition]

The coating composition of the present embodiment comprises the aforementioned aluminum pigment of the present embodiment.

The coating composition of the present embodiment can comprise mica, a coloring pigment and the like, in combination with the aluminum pigment.

Moreover, the coating composition of the present embodiment may also comprise various types of resins, and various types of additives such as an antioxidant, a light stabilizer, a polymerization inhibitor, or a surfactant.

The coating composition of the present embodiment can be produced by mixing the aluminum pigment with various types of materials, as necessary.

The coating composition of the present embodiment can be used as a metallic coating material.

[Coating Film and Article Comprising the Coating Film]

The coating film of the present embodiment comprises the aforementioned aluminum pigment of the present embodiment, and can be formed by applying the aforementioned coating composition to a certain base material.

Various types of articles can be selected as the above described base materials, and the coating film of the present embodiment can be formed on the selected article to obtain products of interest.

Examples of the article include automobile bodies, automobile interior parts, consumer electronics, and optical instruments such as cellphones, smart phones, PC, tablets, cameras and televisions.

The method of forming a coating film is not particularly limited, and a conventionally known method can be applied, as appropriate, depending on the type of an article of interest.

[Ink Composition and Printed Product]

The ink composition of the present embodiment comprises the aforementioned aluminum pigment of the present embodiment.

The ink composition of the present embodiment can comprise a predetermined coloring pigment, solvent, and the like, in combination with the aforementioned aluminum pigment.

Moreover, the ink composition of the present embodiment may also comprise various types of resins, and various types of additives such as an antioxidant, a light stabilizer, a polymerization inhibitor, or a surfactant.

The ink composition of the present embodiment can be produced by mixing the aluminum pigment with various types of materials, as necessary, and can be used as metallic ink.

Furthermore, the printed product of the present embodiment comprises the aforementioned aluminum pigment of the present embodiment, and can be formed by performing printing using the aforementioned ink composition. An example of the printed product is an ink printed product, in which a coating film is formed by gravure printing, offset printing, screen printing, etc.

[Other Intended Uses]

In addition to the above, the aluminum pigment of the present embodiment can be used as a water-resistant binder or filler by being kneaded with a resin or the like.

EXAMPLES

Hereinafter, the present embodiment will be described in more detail in the following examples and comparative examples.

However, these examples are not intended to limit the present embodiment.

It is to be noted that various types of physical properties, which are used in the following examples and comparative examples, are measured by the following measurement methods.

[(I) Average Particle Thickness: t]

((1) Production of Coated Plate)

Using the aluminum pigment obtained in each of the after-mentioned examples and comparative examples, a metallic base coating material was produced with the following composition.

Aluminum pigment: 2 g
Thinner: 50 g
(Manufactured by Musashi Paint Co., Ltd., product name "PLA-ACE Thinner No. 2726")
Acrylic resin: 33 g
(Manufactured by Musashi Paint Co., Ltd., product name "PLA-ACE No. 7160")

Using an air spray device, the above described coating material was applied to an ABS resin plate to a dry film thickness of 20 μm, and it was then dried in an oven at 60° C. for 30 minutes to obtain a metallic base coated plate.

A top coat coating material produced with the following composition was applied onto the above described metallic base coated plate, using an air spray device.

Hitaloid Varnish 3685S (manufactured by Hitachi Chemical Co., Ltd.): 25 g
Mixed thinner: 20 g
(Mixing ratio of solvents: 45% by mass of toluene, 30% by mass of butyl acetate, 20% by mass of ethyl acetate, and 5% by mass of 2-acetoxy-1-methoxypropane)
DURANATE TPA100 (manufactured by Asahi Kasei Chemicals): 5 g After completion of the above described coating, the plate was dried in an oven at 60° C. for 30 minutes to obtain a coated plate for evaluation.

((2) Production of Cross Section of Coating Film)

Using the above-produced coated plate for evaluation, a cross section of a coating film was produced by the following procedures.

Using scissors, the above described coated plate for evaluation was cut into a square with a size of 2 cm×2 cm.

From the coated plate for evaluation, which had been cut into a square of 2 cm×2 cm, coating film cross sections were repeatedly cut out, using a large rotary microtome (manufactured by Yamato Kohki Industrial Co., Ltd./RV-240), and microscopic aluminum acrylic resins projecting from the cross sections were then removed.

The thus obtained coating film cross sections were each set in an ion milling apparatus (manufactured by JOEL/IB-09010CP), such that a portion 20 μm apart from the coating film cross section can be irradiated with ion beam, and thereafter, the cross section was subjected to an ion milling treatment, so as to produce a coating film cross section for obtaining the after-mentioned FE-SEM image.

((3) Obtaining of Particle Cross Section (FE-SEM Image))

The coating film cross section (coated plate) obtained in the above ((2) Production of cross section of coating film) was adhered to an SEM sample stand in parallel therewith, and thereafter, using field emission-type FM-SEM (manufactured by HITACHI/S-4700), the FE-SEM image of the above described coating film cross section was obtained.

With regard to conditions for observation and obtaining of FE-SEM, the accelerating voltage was adjusted to 5.0 kV, and the image magnifications were set at 10,000-fold and 5,000-fold. The particle thickness was set to be high magnification of 10,000-fold, and the measurement was then carried out. On the other hand, the after-mentioned particle planarity (shortest length/particle cross-sectional length) was measured at a magnification of 5,000-fold.

Moreover, before obtaining (capturing) the FE-SEM image, an electronic engineering shaft alignment treatment was carried out, so that distortion could not be generated at the boundary between the aluminum particles and the acrylic resin in the FE-SEM image.

((4) Analysis (Measurement of Average Thickness of Particles in Particle Cross Section))

Using the FE-SEM image (10,000-fold) obtained by the procedures described in the above ((I)-(3)) Obtaining of particle cross section (FE-SEM image)) and image analysis software Win Roof version 5.5 (manufactured by MITANI CORPORATION), the measurement of a particle thickness in the cross section of the aluminum particle and calculation of the average thickness were carried out.

An FE-SEM image, which was to be subjected to the measurement of a particle thickness in the cross section of the aluminum particle, was displayed, an ROI line was then selected, and the ROI line was then adjusted to 5 μm scale of the image. Then, the length and the unit were set by inputting them from registration and/or change.

Subsequently, an image, which was to be subjected to the measurement of the thickness of the cross section of the aluminum particle, was displayed, and rectangular ROI was then selected. Thereafter, the rectangular ROI was adjusted to the cross section of the particle, and binary coded processing was then carried out.

Subsequently, the measurement item of a vertical chord length was selected, the measurement was then executed, and an automatic measurement value (vertical chord length value) obtained using image analysis software was displayed on the image.

Thus, using the above described image analysis software Win Roof version 5.5, 100 particles having a value within ±50% of the mean particle diameter d50, which is described later in [(IV) Mean particle diameter: d50], were selected, and the thickness in the cross section of an aluminum particle was automatically measured. The arithmetic mean value of the 100 particles was calculated, and the average thickness t of the particles was obtained.

[(II) Evaluation of Particle Planarity (Shortest Length/Particle Cross-Sectional Length)]

Using the FE-SEM image (5,000-fold) obtained by the procedures described in the above ((I)-(3)) Obtaining of particle cross section (FE-SEM image) and the image analysis software used in the above ((I)-(4)) Analysis, the planarity of an aluminum particle (shortest length/particle cross-sectional length) was measured.

An example of the image of measuring particle planarity (shortest length/particle cross-sectional length) is shown in FIG. 1.

The straight line tool and curve tool of the above described image analysis software Win Roof version 5.5 were selected, and the measurement value obtained by connecting both ends of the cross section of an aluminum particle with a straight line was defined as a shortest length, and the measurement value obtained by connecting both ends with a line along the cross section of the aluminum particle was defined as a particle cross-sectional length. The value of (shortest length/particle cross-sectional length) was defined as the planarity of the aluminum particle.

The above described procedures were repeatedly carried out, and the planarity values of 100 aluminum particles were obtained.

In addition, the aluminum particles selected to obtain the planarity values had a value within ±50% of the after-mentioned [IV] Mean particle diameter: d50.

As the planarity value of a particle approaches to 1.00, it means that the degree of warpage, distortion or the like of the particle is small.

FIG. 2 shows a photograph of the FE-SEM image of the cross section of the aluminum pigment particle of the after-mentioned [Example 2], which was obtained using field emission-type FM-SEM (manufactured by HITACHI/S-4700).

FIG. 3 shows a photograph of the FE-SEM image of the cross section of the aluminum pigment particle of the after-mentioned [Comparative Example 1], which was obtained using field emission-type FM-SEM (manufactured by HITACHI/S-4700).

When FIG. 2 was compared with FIG. 3, it was found that the particle cross-sectional length was closer to the shortest length in FIG. 2 than in FIG. 3.

[(III) Percentage of Plane Particles]

Based on the values of particle planarity (shortest length/particle cross-sectional length) of the 100 aluminum particles obtained in the above described (II), the threshold value of the planarity of a particle was set at 0.95, and the ratio of aluminum particles having a particle planarity that was in the range of 0.95 to 1.00 was obtained.

The aluminum pigment of the present embodiment comprises plane particles having a particle planarity that is in the range of 0.95 to 1.00 at 60% to 100% by number.

[(IV) Mean Particle Diameter: d50]

The mean particle diameter (d50) of the aluminum pigment was measured using a laser diffraction/scattering-type particle size distribution measuring apparatus (LA-300/HORIBA, Ltd.).

As a measurement solvent, mineral spirits was used.

The measurement was carried out in accordance with an instruction manual included with the apparatus. As an important notice, the aluminum pigment used as a sample was subjected to ultrasonic dispersion for 2 minutes as a pretreatment, and was then poured into a dispersion tank. After the pigment had been confirmed to have an appropriate concentration, the measurement was initiated.

After completion of the measurement, d50 was automatically displayed.

[(V) Aspect Ratio (d50/t)]

The mean particle diameter d50 value measured in the above (IV) was divided by the average thickness t of the particles obtained in the above analysis/arithmetic mean value, and the obtained value (d50/t) was defined as an aspect ratio.

[(VI) Roughness Average of Particles: Ra]

The roughness average Ra of the aluminum pigment was measured by the following method.

((1) Pretreatment)

The aluminum pigment obtained in each of the after-mentioned examples and comparative examples was a mixture with mineral spirits and solvent naphtha. Thus, the aluminum pigment was subjected to a washing treatment.

100 mg of Al paste was collected into a screw tube, and 5 mL of toluene was then added thereto.

The screw tube was shaken by handshaking for several tens of seconds for dispersion of the mixture, and the reaction mixture was then subjected to centrifugation.

A supernatant was removed, and 5 mL of toluene was added thereto again. Thereafter, dispersion and centrifugation were carried out in the same manner as described above.

A small amount (approximately several mg) of the precipitated Al paste was collected, and it was then dispersed in 5 mL of toluene. Thereafter, the dispersion was added dropwise to 1 cm-square silicon wafer, and was then air-dried.

((2) Obtaining of Image to be Measured)

The roughness average Ra of particles was measured under the following conditions.

Visible particles (4 μm-square) were selected, and the image thereof for measurement was then obtained under the following conditions.

Apparatus: Dimension Icon, manufactured by Bruker AXS

Measurement mode: Tapping mode

Probe: NCH-type Si single crystal probe (k=040 N/m typ)

Measurement visual field: 4 μm-square/512 pixels ((3) Analysis and Calculation of Ra)

The analysis was carried out using analysis software included with the apparatus.

After primary inclination correction had been carried out, Ra was calculated using roughness analysis function.

Software: Nanoscope Analysis (analysis software included with the apparatus)

Correction after measurement: primary inclination correction

Roughness calculation: Ra (automatic calculation)

[(VII) Evaluation of Brightness, Quantity of Scattered Light, and Denseness]

((1) Production of Coating Material and Coated Plate)

Using the aluminum pigment obtained in each of the after-mentioned examples and comparative examples, a metallic base coating material was produced with the following composition.

Aluminum pigment: 2 g

Mixed thinner: 6 g (Mixing ratio of solvents: 40% by mass of methyl ethyl ketone, 40% by mass of ethyl acetate, and 20% by mass of isopropyl alcohol)

Polyurethane resin: 8 g (Manufactured by Sanyo Chemical Industries, Ltd., product name "SANPRENE IB Series 1700D")

Subsequently, using a bar coater (No. 6), the above described metallic base coating material was applied onto a PET film to result in a dry film thickness of 3 μm, and it was then dried at room temperature to obtain a metallic base coated plate for evaluation.

((2) Measurement of Brightness, Quantity of Scattered Light, and Denseness)

Brightness was evaluated using a strange angle colorimeter (manufactured by Suga Test Instruments Co., Ltd.).

The incidence angle was set at 45 degrees, and the acceptance angle close to the regular reflection light, from which the light in the specular reflection area reflecting on the surface of the coating film had been removed, was set at 5 degrees (L5). Under these conditions, brightness was measured.

Brightness is a parameter that is proportional to the intensity of regular reflection light from the aluminum pigment, and it was determined that, as the measurement value increases, regular reflection light intensity is high and brightness is excellent.

The quantity of scattered light was evaluated using an MA68II multi-angle spectrophotometric colorimeter (manufactured by X-Rite, U.S.A.).

Regarding geometric conditions, the incidence angle was set at 45 degrees, and a full range of received light (based on regular reflection angles) were set at 15 degrees, 25 degrees, 45 degrees, 75 degrees, and 110 degrees.

The quantity of scattered light is a parameter that corresponds to the value of the received light L at 110 degrees based on the regular reflection angle, and it was determined that, as the measurement value decreases, the coated plate has a small quantity of scattered light, and has excellent optical characteristics.

As an indicator of denseness, graininess was evaluated using BYK-mac (manufactured by BYK Gardener).

In order to evaluate graininess, diffused light (−15 degrees, 45 degrees, and 75 degrees) was detected using a camera detector (0 degree), and the uniformity of a light or dark portion was displayed as a numerical value.

The value of graininess was read, and it was determined that, as the measurement value of the uniformity of a light or dark portion decreases, denseness can be obtained.

Example 1

A ball mill with an inner diameter of 2 m and a length of 30 cm was filled with a mixture containing 9.5 kg of a raw material atomized aluminum powder (mean particle diameter: 2 μm), 45.8 kg of mineral spirits, and 570 g of oleic acid, and thereafter, the mixture was ground using 309 kg of zirconia balls each having a diameter of 0.8 mm.

The used zirconia balls comprised 94% by mass or more of $ZrO_2$ as a main ingredient, and had a roundness of 95% or more.

The rotation speed of the ball mill was set at 13 rpm, and the grinding operation was carried out for 80 hours.

After completion of the grinding operation, the slurry in the mill was washed out with mineral spirits, and was then subjected to a 400-mesh vibration sieve. Thereafter, the passed slurry was filtrated through a filter, and was then concentrated to obtain a cake having 76% by mass of heating residue.

The obtained cake was transferred into a vertical mixer, and a predetermined amount of solvent naphtha was then added thereto, followed by blending for 20 minutes, so as to obtain an aluminum pigment having 66% by mass of heating residue.

The brightness, quantity of scattered light, and denseness of the obtained aluminum pigment were evaluated according to the above described (VII).

The evaluation results are shown in Table 1.

Example 2

A raw material atomized aluminum powder (mean particle diameter: 2.2 μm) was used, and the rotation speed of a ball mill was set at 11 rpm. The grinding operation was carried out for 110 hours.

Except for the aforementioned conditions, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Example 3

A raw material atomized aluminum powder (mean particle diameter: 3.5 μm) was used, and a ball mill was filled with a mixture consisting of the raw material atomized aluminum powder, 53.4 kg of mineral spirits, and 950 g of oleic acid. The rotation speed of the ball mill was set at 17 rpm, and the grinding operation was carried out for 45 hours.

Except for the aforementioned conditions, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Example 4

A ball mill filled with the same mixture as in the above described [Example 2] was used, and only the time required for the grinding operation using the ball mill was changed to 150 hours. Then, the grinding operation was carried out.

Except for the aforementioned conditions, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Example 5

A raw material atomized aluminum powder (mean particle diameter: 1.7 μm) was used. That is, 8.6 kg of the raw material atomized aluminum powder and 515 g of oleic acid were used. Other composition was the same as in [Example 1].

In addition, the time required for the grinding operation using a ball mill was set at 105 hours, and the grinding operation was carried out.

After completion of the grinding operation, a cake having 74% by mass of heating residue was obtained. Except for this, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Example 6

There were used 309 kg of glass balls each having a diameter of 1.3 mm. A ball mill was filled with the same mixture as in the above described [Example 2], and the rotation speed of the ball mill was set at 11 rpm. The grinding operation was carried out for 120 hours.

Except for the aforementioned conditions, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Comparative Example 1

A ball mill was filled with the same mixture as in the above described [Example 1], and the rotation speed of the ball mill was set at 24 rpm. The grinding operation was carried out for 55 hours.

Except for the aforementioned conditions, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Comparative Example 2

A ball mill was filled with the same mixture as in the above described [Example 1], and the rotation speed of the ball mill was set at 24 rpm. The grinding operation was carried out for 80 hours.

Except for the aforementioned conditions, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Comparative Example 3

The same raw material atomized aluminum powder as in the above described [Example 2] was used, and the amount thereof used for filling was also set at the same as in Example 2. Then, 82.0 kg of mineral spirits, 950 g of oleic acid, and 309 kg of zirconia balls each having a diameter of 2.0 mm were used. The rotation speed of a ball mill was set at 17 rpm, and the grinding operation was carried out for 40 hours.

With the exception that a cake having 78% by mass of heating residue was obtained after completion of the grinding operation, the same operations as in [Example 1] were carried out, so as to obtain an aluminum pigment.

The brightness, quantity of scattered light, and denseness of the obtained aluminum pigment were evaluated according to the above described (VII).

The evaluation results are shown in Table 1.

Comparative Example 4

A raw material atomized aluminum powder (mean particle diameter: 4.4 µm) was used. That is, 9.5 kg of the raw material atomized aluminum powder, 42.0 kg of mineral spirits, 950 g of stearylamine, and 408 kg of steel balls each having a diameter of 2.4 mm were used.

The rotation speed of a ball mill was set at 17 rpm, and the grinding operation was carried out for 8 hours.

After completion of the grinding operation, a cake having 82% by mass of heating residue was obtained. Except for this, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Comparative Example 5

A raw material atomized aluminum powder (mean particle diameter: 6.0 µm) was used.

The rotation speed of a ball mill was set at 17 rpm, and the grinding operation was carried out for 40 hours.

Except for the aforementioned conditions, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Comparative Example 6

The same raw material atomized aluminum powder as in the above described [Example 1] was used, and the amount thereof used for filling was also set at the same as in Example 1.

There were used 309 kg of glass balls having a diameter of 3.0 mm. The rotation speed of a ball mill was set at 17 rpm, and the grinding operation was carried out for 65 hours.

Except for the aforementioned conditions, the same operations as in [Example 1] were carried out to obtain an aluminum pigment.

The brightness, quantity of scattered light, and denseness of the obtained aluminum pigment were evaluated according to the above described (VII).

The evaluation results are shown in Table 1.

Comparative Example 7

The results obtained by evaluating the brightness, quantity of scattered light, and denseness of an aluminum pigment, which had been obtained by a metal deposition method using Metalure L 55700 manufactured by Eckart, are shown in Table 1.

TABLE 1

|  | Plane particle percentage (%) | Average particle thickness (average value of 100 particles) | Mean particle diameter (d50) (µm) | Aspect ratio (d50/t) | Roughness average (Ra) (nm) | Denseness (Graininess) | Brightness (L5) | Quantity of scattered light (L110) |
|---|---|---|---|---|---|---|---|---|
| Example 1 | 82 | 0.082 | 8.0 | 98 | 4.8 | 2.0 | 439 | 16.1 |
| Example 2 | 78 | 0.075 | 9.3 | 124 | 5.4 | 2.2 | 438 | 16.4 |
| Example 3 | 88 | 0.097 | 14.5 | 149 | 4.2 | 2.4 | 418 | 18.2 |
| Example 4 | 68 | 0.057 | 12.1 | 212 | 6.8 | 2.2 | 462 | 16.7 |
| Example 5 | 64 | 0.045 | 10.2 | 227 | 7.6 | 2.1 | 455 | 16.8 |
| Example 6 | 86 | 0.066 | 10.2 | 155 | 5.0 | 2.1 | 440 | 17.2 |
| Comparative Example 1 | 36 | 0.042 | 11.8 | 281 | 12.8 | 2.2 | 377 | 21.8 |
| Comparative Example 2 | 9 | 0.028 | 12.8 | 457 | 14.6 | 2.2 | 348 | 24.7 |
| Comparative Example 3 | 50 | 0.118 | 8.5 | 72 | 11.1 | 2.1 | 370 | 21.9 |
| Comparative Example 4 | 56 | 0.142 | 17.6 | 124 | 9.8 | 3.6 | 342 | 32.2 |

TABLE 1-continued

| | Plane particle percentage (%) | Average particle thickness (average value of 100 particles) | Mean particle diameter (d50) (μm) | Aspect ratio (d50/t) | Roughness average (Ra) (nm) | Denseness (Graininess) | Brightness (L5) | Quantity of scattered light (L110) |
|---|---|---|---|---|---|---|---|---|
| Comparative Example 5 | 72 | 0.114 | 21.0 | 184 | 7.2 | 4.3 | 381 | 24.8 |
| Comparative Example 6 | 41 | 0.060 | 12.0 | 200 | 12.0 | 2.5 | 363 | 26.8 |
| Comparative Example 7 | 55 | 0.041 | 11.2 | 273 | 2.5 | 2.0 | 475 | 21.4 |

From Table 1, it was found that the aluminum pigment of the present invention has denseness, extremely high brightness, and an extremely small amount of scattered light.

The present application is based on Japanese patent application filed to Japanese Patent Office on Aug. 14, 2015 (Japanese Patent Application No. 2015-160205); the disclosure of which is hereby incorporated by reference.

INDUSTRIAL APPLICABILITY

The aluminum pigment of the present invention has industrial applicability as a high-grade metallic coating material for automobile bodies or automobile interior parts, a metallic coating material for repairing automobiles, a metallic coating material for consumer electronics, a metallic coating material for optical instruments such as cellphones, smart phones, PC, tablets, cameras, or televisions, PCM, an industrial metallic coating material, a high-grade metallic printing ink for gravure printing, offset printing, screen printing, etc., and a material for high-grade metallic resin kneading.

The invention claimed is:

1. An aluminum pigment comprising plane particles having a particle planarity (shortest length/particle cross-sectional length) of 0.95 to 1.00 at 60% to 100% by number,
    wherein the shortest length is a length obtained by connecting both ends of the cross section of a particle with a straight line,
    wherein the particle cross-sectional length is a length obtained by connecting both ends of the cross section of a particle with a line along the cross section of the particle,
    wherein a mean particle diameter d50 of the particles is 4 μm to 15 μm,
    wherein an average thickness t of the particles is 0.082 μm to 0.12 μm, and
    wherein a ratio (d50/t) of the mean particle diameter d50 (μm) of the particles to the average thickness t (μm) thereof is 124 or more.

2. The aluminum pigment according to claim 1, comprising the plane particles at 60% to 98% by number.

3. The aluminum pigment according to claim 1, wherein a ratio (d50/t) of the mean particle diameter d50 (μm) of the particles to the average thickness t (μm) thereof is 124 to 183.

4. The aluminum pigment according to claim 1, wherein a surface roughness average Ra of the particles is 2 to 12 nm.

5. The aluminum pigment according to claim 1, wherein a ratio (d50/t) of the mean particle diameter d50 (μm) of the particles to the average thickness t (μm) thereof is 124 to 149.

6. A method for producing the aluminum pigment according to claim 1, comprising grinding an atomized aluminum powder using a grinding apparatus comprising a ball mill.

7. A coating composition comprising the aluminum pigment according to claim 1.

8. A coating film which is obtained by applying the coating composition according to claim 7 to a base material and drying the applied composition.

9. An article having the coating film according to claim 8.

10. An ink composition comprising the aluminum pigment according to claim 1.

11. A printed product comprising the ink composition according to claim 10.

* * * * *